US010796500B2

(12) United States Patent
Sandhu et al.

(10) Patent No.: US 10,796,500 B2
(45) Date of Patent: Oct. 6, 2020

(54) ELECTRONIC COMMUNICATION MODULES PROVISIONING FOR SMART CONNECTIVITY

(71) Applicant: FORD GLOBAL TECHNOLOGIES, LLC, Dearborn, MI (US)

(72) Inventors: Harminder Singh Sandhu, Northville, MI (US); David Marvin Gersabeck, Commerce Township, MI (US); Derek L. Porter, Sr., Southfield, MI (US); Ken Mueller, Franklin, MI (US); Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 15/666,046

(22) Filed: Aug. 1, 2017

(65) Prior Publication Data
US 2019/0043271 A1 Feb. 7, 2019

(51) Int. Cl.
*G07C 5/00* (2006.01)
*H04L 29/14* (2006.01)
*H04L 29/08* (2006.01)
*H04W 76/16* (2018.01)
*G07C 5/08* (2006.01)
*H04L 29/06* (2006.01)

(52) U.S. Cl.
CPC ........... *G07C 5/008* (2013.01); *G07C 5/0808* (2013.01); *H04L 67/12* (2013.01); *H04L 67/2814* (2013.01); *H04L 67/42* (2013.01); *H04L 69/40* (2013.01); *H04W 76/16* (2018.02)

(58) Field of Classification Search
None
See application file for complete search history.

(56) References Cited

U.S. PATENT DOCUMENTS

| | | | | |
|---|---|---|---|---|
| 5,612,890 A | * | 3/1997 | Strasser | B67D 7/04 700/232 |
| 9,280,653 B2 | | 3/2016 | Forest | |
| 9,792,440 B1 | * | 10/2017 | Wang | H04L 63/1466 |
| 10,735,260 B2 | * | 8/2020 | Maeda | H04L 12/40169 |

(Continued)

FOREIGN PATENT DOCUMENTS

| CN | 205318531 U | * | 6/2016 |
|---|---|---|---|
| CN | 106411973 A | * | 2/2017 |
| CN | 105847323 B | * | 12/2018 |

*Primary Examiner* — Shelley Chen
(74) *Attorney, Agent, or Firm* — Michael J. Spenner; Brooks Kushman P.C.

(57) ABSTRACT

An embedded modem for a vehicle is provisioned by requesting confirmation of the modem configuration from a telematics server. A request is received over a vehicle bus from an electronic control unit (ECU) requesting confirmation of an ECU configuration assigned by the end-of-line systems. The embedded modem sends the request to the telematics server for confirmation, and reports a result from the telematics server to the ECU. A telematics server receives a request to provision an ECU from an embedded modem of a vehicle that was provisioned using the telematics server, forwards the request to a backend system configured to process the request, receives a response to the request from the backend server, and makes the response available to the embedded modem.

8 Claims, 7 Drawing Sheets

(56) References Cited

U.S. PATENT DOCUMENTS

| | | | |
|---|---|---|---|
| 2007/0055414 A1* | 3/2007 | Darji | G07C 5/0841 |
| | | | 701/2 |
| 2010/0228404 A1 | 9/2010 | Link, II et al. | |
| 2012/0030512 A1* | 2/2012 | Wadhwa | H04L 67/325 |
| | | | 714/23 |
| 2012/0122431 A1* | 5/2012 | Moon | H04W 4/16 |
| | | | 455/414.1 |
| 2014/0114497 A1* | 4/2014 | Miyake | H04L 9/3271 |
| | | | 701/1 |
| 2014/0337829 A1* | 11/2014 | Ito | H04L 41/0846 |
| | | | 717/175 |
| 2016/0099806 A1 | 4/2016 | Racklyeft et al. | |
| 2017/0201850 A1* | 7/2017 | Raleigh | G06F 3/0482 |
| 2018/0001774 A1* | 1/2018 | Murata | H02J 7/007 |
| 2018/0074811 A1* | 3/2018 | Kiyama | H04L 67/10 |
| 2019/0332813 A1* | 10/2019 | Berthet | G06F 21/86 |

* cited by examiner

ELECTRONIC COMMUNICATION MODULES PROVISIONING FOR SMART CONNECTIVITY

TECHNICAL FIELD

Aspects of the disclosure generally relate to provisioning of components of a vehicle for smart connectivity.

BACKGROUND

Vehicle connectivity has become increasingly common due to smart home and appliance to smart vehicle connections. However, vehicle connectivity has also become increasingly complex with respect to security.

SUMMARY

In one or more illustrative embodiments, a vehicle includes an embedded modem programmed to provision the modem for the vehicle by requesting from a telematics server confirmation of a modem configuration assigned by end-of-line systems, receive a request over a vehicle bus from an electronic control unit (ECU) requesting confirmation of an ECU configuration assigned by the end-of-line systems, send the request to the telematics server for confirmation, and report a result from the telematics server to the ECU.

In one or more illustrative embodiments, a system includes a telematics server programmed to receive a request to provision an ECU from an embedded modem of a vehicle that was provisioned using the telematics server, forward the request to a backend system configured to process the request, receive a response to the request from the backend server, and make the response available to the embedded modem.

In one or more illustrative embodiments, a method includes provisioning an embedded modem of a vehicle using modem metadata received from a manufacturer of the modem, responsive to receiving a request to provision the modem from the embedded modem via a telematics server; and provisioning a controller of the vehicle using controller metadata received from a manufacturer of the controller, responsive to receiving a request to provision the controller from the embedded modem via the telematics server.

DETAILED DESCRIPTION

Figure 1:
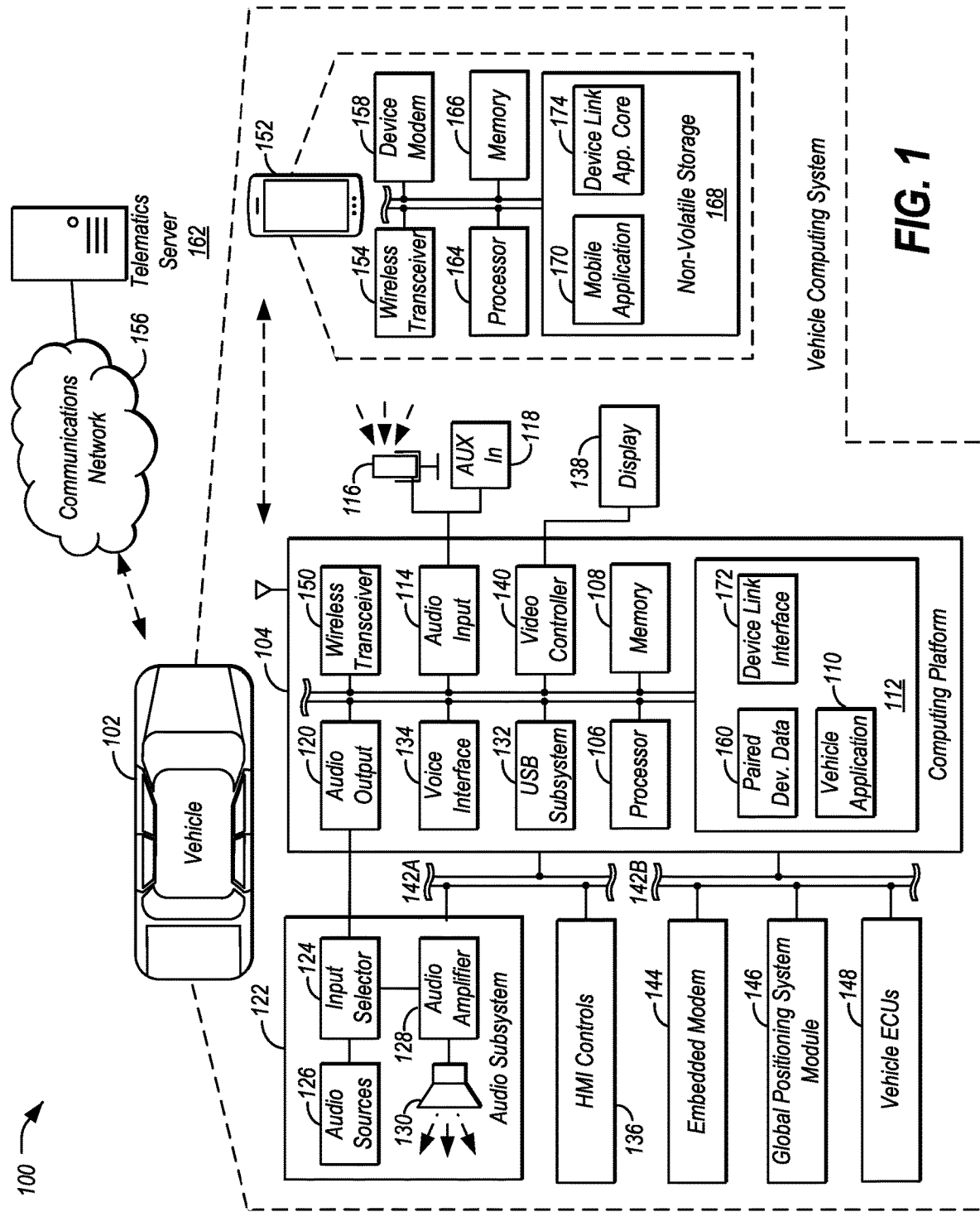
FIG. 1 illustrates an example diagram of a system configured to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicle provisioning of networked components of the vehicle may be done to ensure that each component of the vehicle that may be accessible remotely is properly configured and verified in backend systems. This provisioning may be done before the vehicle is ready to be sold to a customer.

An improved approach to vehicle provisioning includes storing the metadata of vehicle components such as embedded modems and electronics control units (ECUs) in backend systems. This data may be stored to the backend systems prior to the vehicle components being shipped to an assembly plant for vehicle installation. The data to be stored may include Module Electronic Serial Number, Security Keys, Part Numbers, media access control (MAC) addresses, integrated circuit card identifiers (ICCIDs), or other uniquely identifiable information.

The embedded modem may be provisioned using a cellular connection or Wi-Fi connection. After the embedded modem is installed to the vehicle and configured, the modem connects with a server and exchanges modem metadata and vehicle data with a backend system to verify the legitimacy of the embedded modem. The backend system may send a confirmation if the modem is valid and properly configured. Once the embedded modem is successfully provisioned, other ECUs can be provisioned via the communications services of the embedded modem, either in real time or in a batch process.

Real time provisioning of ECUs may follow a process similar to the provisioning of the embedded modem. After an ECU is installed and configured during vehicle assembly, and after the embedded modem is provisioned successfully, the ECU may exchange ECU metadata and vehicle data with backend systems to verify the legitimacy of the ECU. The backend systems may send a confirmation if the ECU is valid and properly configured. In one example, the ECU to be configured may be a BLUETOOTH Low Energy (BLE) ECU designed to provide BLE connectivity to the vehicle.

Provisioning of ECUs may also be performed using batch processing. In the batch processing, once the ECU is installed and configured during vehicle assembly, ECU metadata and vehicle data for multiple ECUs may be collected and sent to the backend systems in a batch. The backend systems may then send a provisioning response to the ECUs via the embedded modem, or may keep the provisioning response information until the ECU is being accessed from the vehicle or from a command from a telematics server or other backend system.

If the ECU is being accessed from within the vehicle (e.g., responsive to user input to vehicle controls or communication to the vehicle via Bluetooth or Wi-Fi) the ECU will attempt to receive provisioning confirmation from the backend systems if the provisioning confirmation has not already been communicated to the ECU.

If the ECU is being accessed from a backend system, the vehicle (e.g., the embedded modem) may verify the ECU provisioning status of the ECU before allowing the ECU to perform network communication. If the ECU is not provisioned, the embedded modem nay report the ECU to the backend server for further action.

In a hybrid provisioning process (e.g., including aspects of the real time and the batch processing), once the ECU is installed and configured during vehicle assembly, ECU metadata and vehicle data may be collected at the plant and sent to the backend systems in real time via the embedded modem. The backend systems may send a provisioning response to the ECU via the embedded modem afterwards in a batch process to confirm/deny the provisioning of multiple vehicle ECUs. Further aspects of the disclosure are discussed in detail below.

FIG. 1 illustrates an example diagram of a system 100 configured to provide telematics services to a vehicle 102. The vehicle 102 may include various types of passenger vehicles, such as crossover utility vehicles (CUV), sport utility vehicles (SUV), trucks, recreational vehicles (RV), boats, planes or other mobile machines for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands, and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio subsystem 122 having audio playback functionality. In other examples, the computing platform 104 may provide the audio output to an occupant through use of one or more dedicated speakers (not illustrated). The audio subsystem 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to a standard grammar 176 describing available command functions, and voice prompt generation for output via the audio subsystem 122. The voice interface 134 may utilize probabilistic voice recognition techniques using the standard grammar 176 in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as an embedded modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio subsystem 122 and the HMI controls 136 may communicate with the computing platform 104 over a first in-vehicle network 142-A, and the embedded modem 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

Responsive to receipt of voice input, the voice interface 134 may produce a short list of possible recognitions based on the standard grammar, as well as a confidence that each is the correct choice. If one of the items on the list has a relatively high confidence and the others are relatively low, the system may execute the high-confidence command or macro. If there is more than one high-confidence macro or command, the voice interface 134 may synthesize speech requesting clarification between the high-confidence commands to which the user can reply. In another strategy, the voice interface 134 may cause the computing platform 104 to provide to a display 138 a prompt for a user to confirm which command to choose. In some examples, the voice interface 134 may receive user selection of the correct choice, and the voice interface 134 may learn from the clarification and retune its recognizer for better performance in the future. If none of the items are of high confidence, the voice interface 134 may request for the user to repeat the request.

The computing platform 104 may also be configured to communicate with mobile devices 152 of the vehicle occupants. The mobile devices 152 may be any of various types of portable computing devices, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternatively, the computing platform 104 may communicate with the mobile device 152 over a wired connection, such as via a USB connection between the mobile device 152 and the USB subsystem 132. In some examples, the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternatively, the computing platform 104 may utilize the embedded modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server 162 or other network services via the device modem 158. The computing platform 104 may also include a device link interface 172 to facilitate the integration of functionality of the mobile applications into the grammar of commands available via the voice interface 134. The device link interface 172 may also provide the mobile applications with access to vehicle information available to the computing platform 104 via the in-vehicle networks 142. An example of a device link interface 172 may be the SYNC APPLINK component of the SYNC system provided by the Ford Motor Company of Dearborn, Mich. Other examples of device link interfaces 172 may include MIRRORLINK, APPLE CARPLAY, and ANDROID AUTO.

Figure 2:
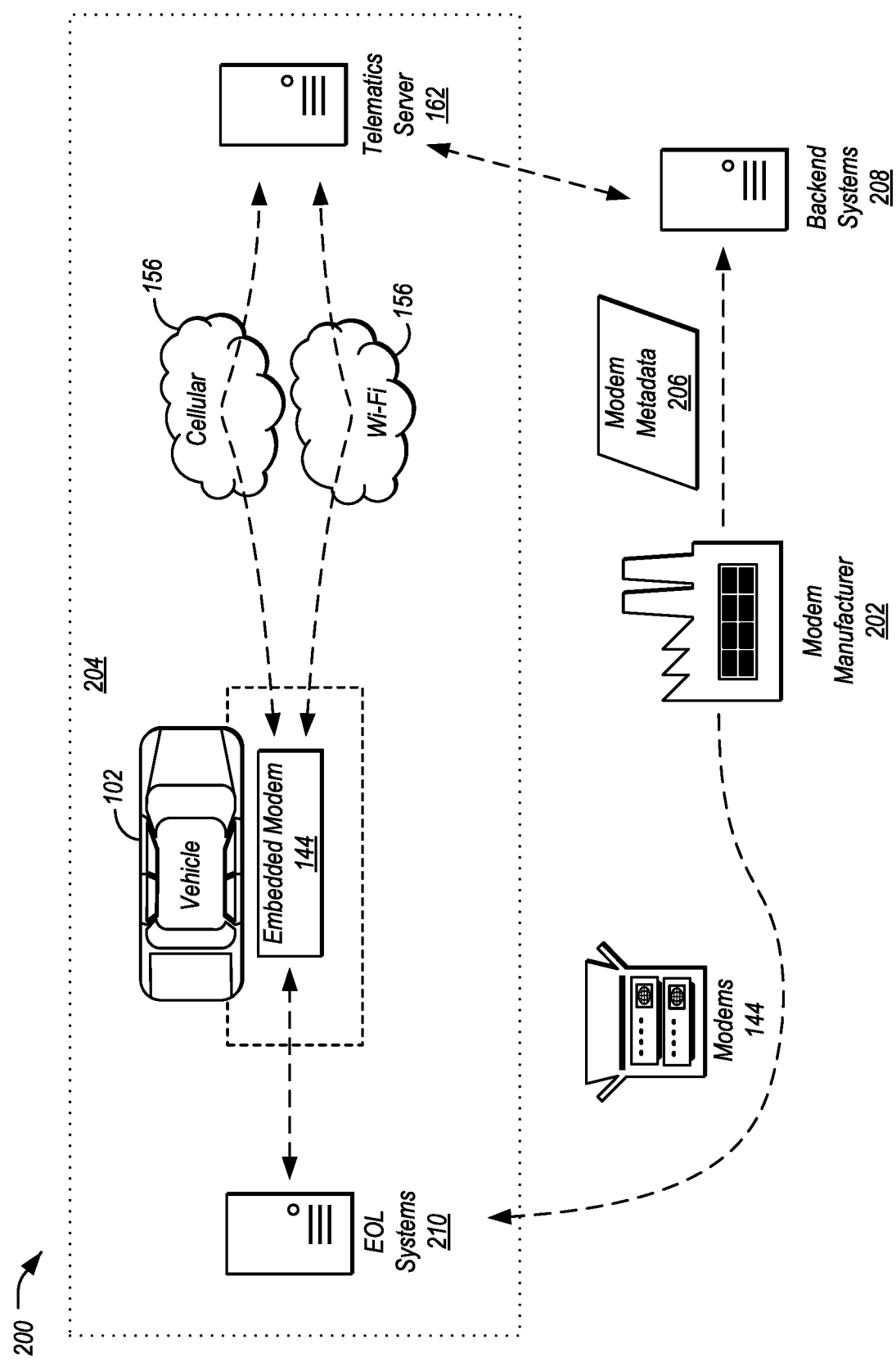
FIG. 2 illustrates an example diagram of provisioning of the embedded modem.

FIG. 2 illustrates an example diagram 200 of provisioning of the embedded modem 144. As shown, a modem manufacturer 202 ships modems 144 to a vehicle assembly plant 204. The modem manufacturer 202 further provides modem metadata 206 to backend systems 208. The modem metadata 206 may include information such as Module Electronic Serial Number, Security Keys, Part Numbers, MAC addresses, ICCIDs, or other uniquely identifiable information of the modems 144. The backend systems 208 may include various network-capable computing devices configured to receive and store modem metadata 206 and other information, and make determinations regarding the configuration and provisioning of the modems 144 being installed to the vehicles 102 at the vehicle assembly plant 204.

The end-of-line systems 210 of the vehicle assembly plant 204 may be configured to set an initial configuration of the embedded modem 144 installed to the vehicle 102. In an example, the end-of-line systems 210 may apply software, firmware, and/or default settings in accordance with various factors. These factors may include, as some possibilities, a make of the vehicle 102, a model of the vehicle 102, a geographic region to which the vehicle 102 is destined, a country to which the vehicle 102 is destined, and a level of software or firmware that is currently available for the embedded modem 144.

The embedded modem 144 may communicate via cellular connection or Wi-Fi connection over a communications network 156 to a telematics server 162. In some examples, the telematics server 162 may be a cloud server located in a region to which the vehicle 102 or the vehicle assembly plant 204 is assigned, such that the telematics server 162 that is being accessed is local to the vehicle 102 or the vehicle assembly plant 204. The telematics server 162 may query the backend systems 208 to verify the legitimacy and configuration of the embedded modem 144 as installed to the vehicle 102. For instance, the telematics server 162 may receive modem metadata 206 and vehicle identification data (e.g., VIN, make, model, etc.) from the vehicle 102, and may provide that information to the backend systems 208 for review. If the configuration is approved by the backend systems 208, the backend systems 208 return a positive configuration result to the telematics server 162, which in turn forwards the result to the vehicle 102. If provisioning of the embedded modem 144 is successful, other ECUs 148 can be provisioned using the services of the embedded modem 144. If provisioning is unsuccessful, the backend systems 208 may flag the vehicle 102 as requiring follow-up to address the failure. Further aspects of the provisioning of the embedded modem 144 are discussed in detail with respect to the process 400 shown in FIG. 4

Figure 3:
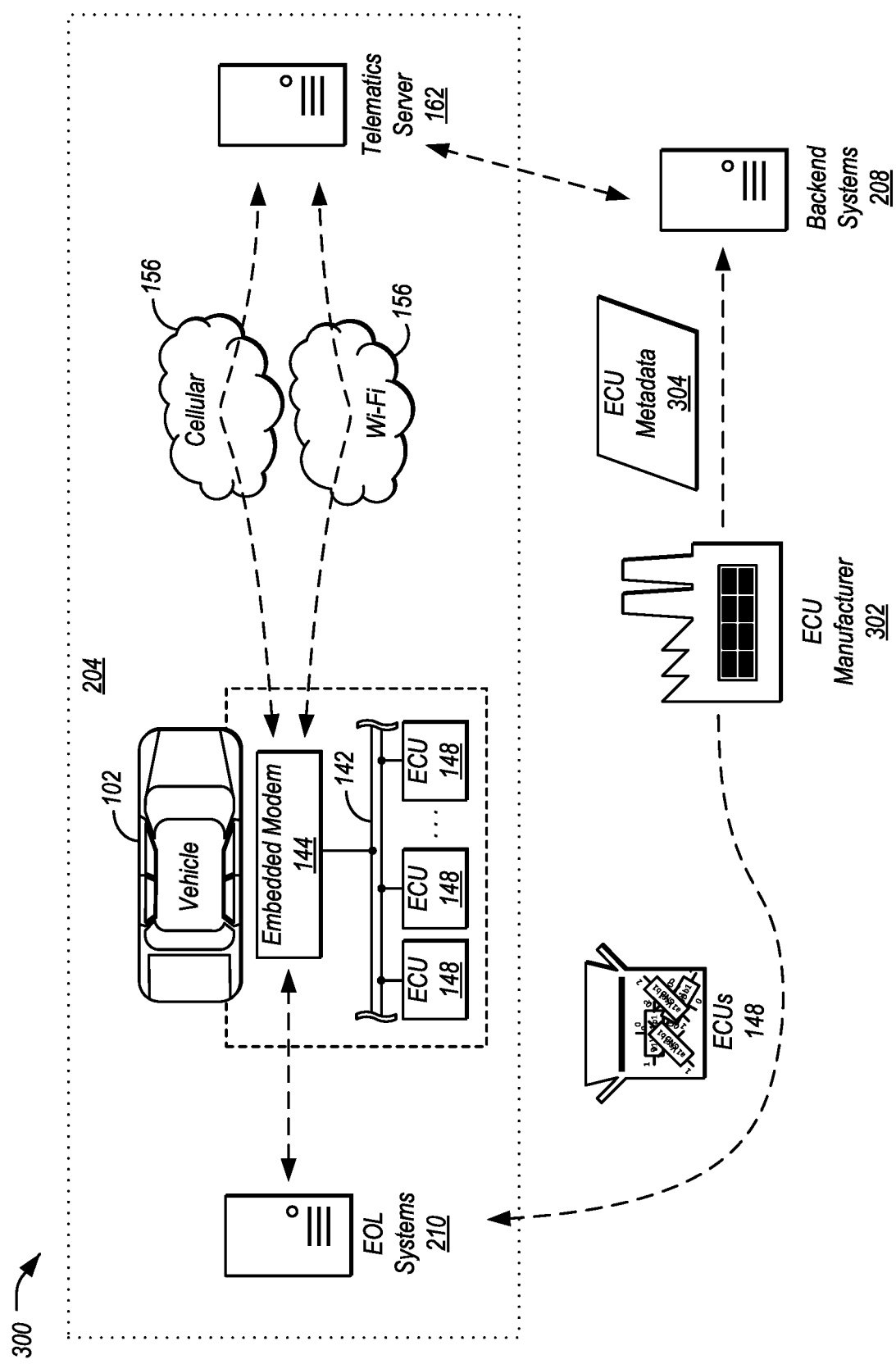
FIG. 3 illustrates an example diagram of provisioning of vehicle ECUs utilizing the services of the embedded modem.

FIG. 3 illustrates an example diagram 300 of provisioning of vehicle ECUs 148 utilizing the services of the embedded modem 144. As shown, an ECU manufacturer 302 ships ECUs 148 to the vehicle assembly plant 204. The ECU manufacturer 302 further provides ECU metadata 304 to the backend systems 208. Similar to the modem metadata 206, the ECU metadata 304 may include information such as Module Electronic Serial Number, Security Keys, Part Numbers, MAC addresses, ICCIDs, or other uniquely identifiable information of the ECUs 148. Similar to as done with the modems 144, the backend systems 208 store the ECU metadata 304 and other information, and make determinations regarding the configuration and provisioning of the ECUs 148 being installed to the vehicles 102 at the vehicle assembly plant 204.

The end-of-line systems 210 of the vehicle assembly plant 204 may be further configured to set an initial configuration of the ECUs 148 installed to the vehicle 102. Similar to as discussed above for modems 144, the end-of-line systems 210 may apply software, firmware, and/or default settings in accordance with various factors. These factors may include, as some possibilities, a make of the vehicle 102, a model of the vehicle 102, a geographic region to which the vehicle 102 is destined, a country to which the vehicle 102 is destined, and a level of software or firmware that is currently available for the ECUs 148 being installed to the vehicle 102.

If the embedded modem 144 has been provisioned, then the communications functionality of the embedded modem 144 may be usable for provisioning of the ECUs 148 as well. For instance, the embedded modem 144 may communicate via cellular or Wi-Fi over a communications network 156 to a telematics server 162 to facilitate the provisioning of the ECUs 148. Generally, the embedded modem 144 may facilitate the providing of ECU metadata 304 and vehicle identification data (e.g., VIN, make, model, etc.) from the vehicle 102 to the telematics server 162. The telematics server 162 may accordingly receive the information and provide that information to the backend systems 208 for review. If the configuration is approved by the backend systems 208, the backend systems 208 return a positive configuration result to the telematics server 162, which in turn forwards the result to the vehicle 102. If provisioning is unsuccessful, the backend systems 208 may flag the vehicle 102 as requiring follow-up to address the failure. Further aspects of the provisioning of the embedded modem 144 are discussed in detail with respect to the processes 500-700 shown in FIGS. 4-7.

Figure 4:
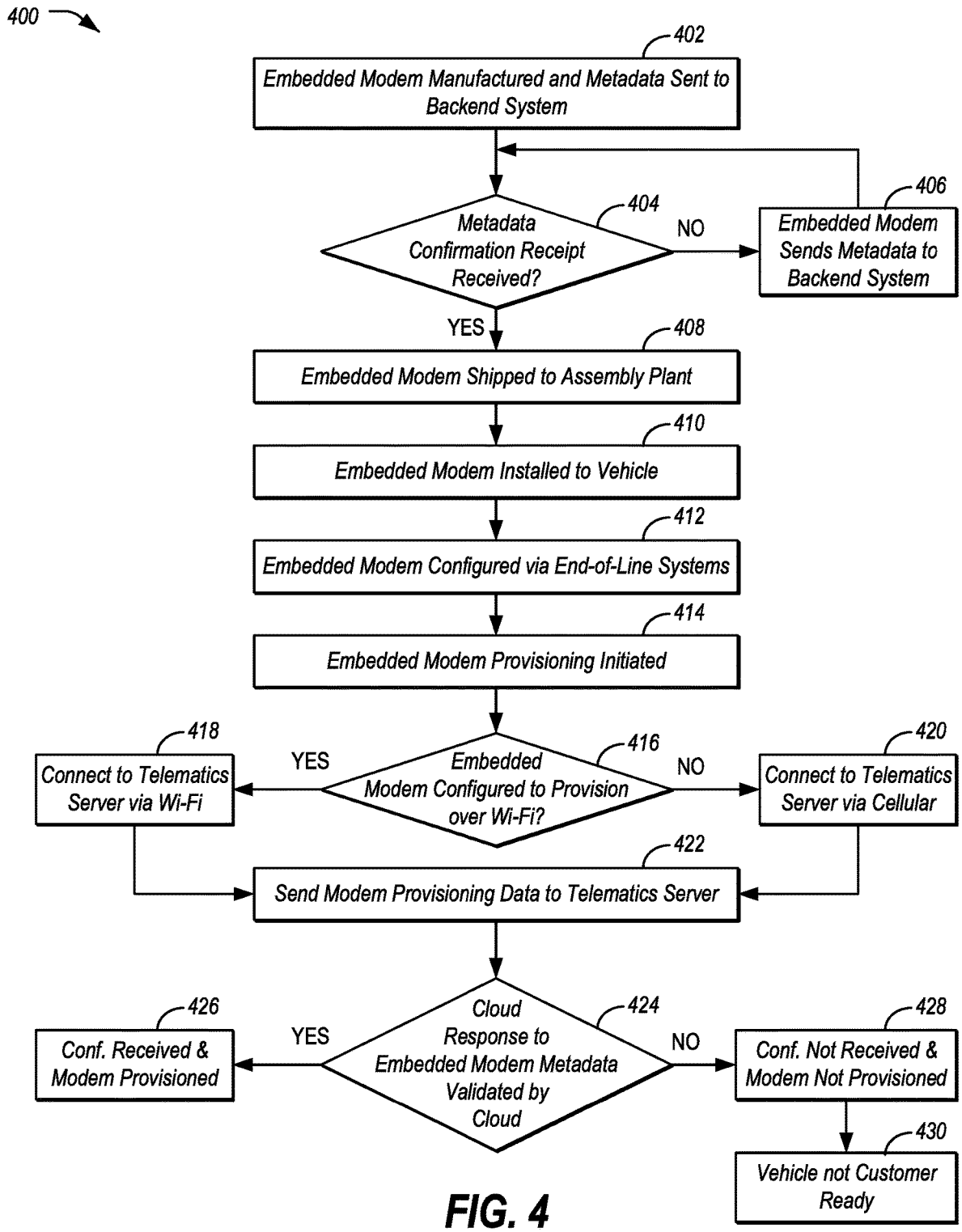
FIG. 4 illustrates an example process for provisioning of the embedded modem.

FIG. 4 illustrates an example process 400 for provisioning of the embedded modem 144. In an example, the process 400 may be performed utilizing system elements such as shown above with respect to the diagram 200.

At operation 402, the embedded modem 144 is manufactured by the modem manufacturer 202 and the modem manufacturer 202 sends the modem metadata 206 to the backend systems 208. The backend systems 208 may accordingly be intended to receive the modem metadata 206 for further processing.

At 404, the backend systems 208 determine whether the modem metadata 206 was received. In an example, the backend systems 208 may receive a request to provision a modem 144, but may not locate any modem metadata 206 corresponding to any identifiers of the modem 144 being provisioned. If no such data is located, control passes to operation 406. If the data is located, control passes to operation 408.

The backend systems 208 request the modem metadata 206 from the embedded modem 144 at 406. The embedded modem 144 being provisioned may accordingly respond and provide the backend systems 208 with the modem metadata 206 corresponding to the embedded modem 144. After operation 406, control returns to operation 404.

At 408, the embedded modem 144 is shipped to the vehicle assembly plant 204. At 410, the embedded modem 144 is installed into the vehicle 102. At 412, the embedded modem 144 is configured via the end-of-line systems 210. For example, the end-of-line systems 210 may apply software, firmware, and/or default settings in accordance with vehicle 102 make, model, destination geography, destination country, or other factors. It should be noted that the specific order of certain steps in the process 400 may vary. For instance, the embedded modem 144 may be shipped to the vehicle assembly plant 204 before execution of operations 404 and/or 406.

The embedded modem 144 initiates modem provisioning at operation 414. In an example, the embedded modem 144 detects that the modem 144 has been powered on with the vehicle 102 systems via the end-of-line systems 210. Responsive to detecting that the modem 144 is active, the modem 144 queries its memory to identify whether the modem 144 has attempted provisioning. If not, the modem 144 initiates provisioning mode.

At 416, the embedded modem 144 determines whether the embedded modem 144 is configured to provision over Wi-Fi. In an example, the embedded modem 144 queries its memory to identify whether the settings applied to the modem 144 (e.g., in operation 412) indicate that the modem 144 can utilize Wi-Fi connections for provisioning. If so, control passes to operation 418 in which the embedded modem 144 connects to the telematics server 162 via Wi-Fi. Otherwise, control passes to operation 420 in which the embedded modem 144 connects to the telematics server 162 via cellular.

At operation 422, the embedded modem 144 sends modem provisioning data to the telematics server 162. In an example, the modem provisioning data includes the modem metadata 206 as well as vehicle identification data (e.g., VIN, make, model, etc.). The telematics server 162 may receive the modem provisioning data, and may provide that information to the backend systems 208 for review.

At 424, the embedded modem 144 determines whether a response to the sending of the modem provisioning data is received. In an example, if the configuration of the vehicle 102 is approved by the backend systems 208, the backend systems 208 return a positive configuration result to the telematics server 162, which in turn forwards the result to the vehicle 102. If provisioning is unsuccessful, the backend systems 208 may flag the vehicle 102 as requiring follow-up to address the failure. During an unsuccessful provisioning, the backend systems 208 may also return a negative configuration result to the telematics server 162, which in turn forwards the result to the vehicle 102. If provisioning was successful and the configuration was validated, control passes to operation 426. Otherwise, control passes to operation 428.

At operation 426, the embedded modem 144 is provisioned and ready for use. In some examples, the embedded modem 144 may write to storage that the modem 144 was successfully provisioned. Once provisioned, the embedded modem 144 may be utilized for communication by the vehicle 102. Additionally, the provisioned embedded modem 144 may be utilized for provisioning of ECUs 148 of the vehicle 102 as well. Further aspects of using the embedded modem 144 for provisioning of ECUs 148 are discussed in detail with respect to the processes 500-700 shown in FIGS. 4-7.

At 428, the embedded modem 144 remains unprovisioned. Accordingly, embedded modem 144 is not ready for use, and the vehicle 102 is not customer ready as indicated at operation 430.

Figure 5:
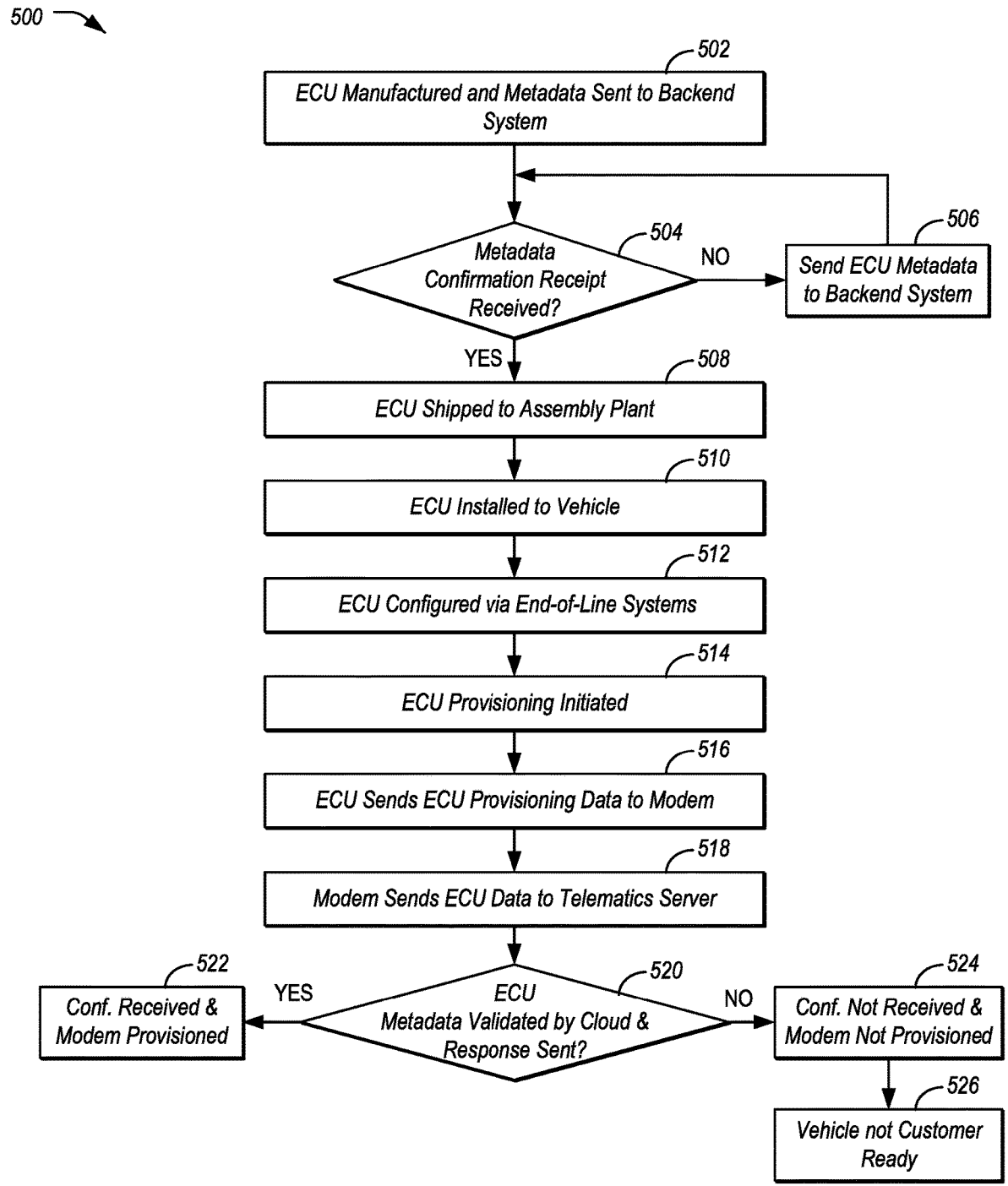
FIG. 5 illustrates an example process for real-time provisioning of vehicle ECUs utilizing the services of the embedded modem.

FIG. 5 illustrates an example process 500 for real-time provisioning of vehicle ECUs 148 utilizing the services of the embedded modem 144.

At 502, ECUs 148 are manufactured by the ECU manufacturer 302 and the ECU manufacturer 302 sends the ECU metadata 304 to the backend systems 208.

At 504, the backend systems 208 determine whether the ECU metadata 304 was received. In an example, the backend systems 208 may receive a request to provision an ECU 148, but may not locate any ECU metadata 304 corresponding to any identifiers of the modem 144 being provisioned. If no such data is located, control passes to operation 506. If the data is located, control passes to operation 508.

The backend systems 208 request the ECU metadata 304 for the ECU 148 from the embedded modem 144 at 506. The embedded modem 144 may forward the request to the ECU 148, and the ECU 148 being provisioned may accordingly respond and provide the information back to the embedded modem 144. The embedded modem 144 may then send the ECU metadata 304 corresponding to the ECU 148 back to the backend systems 208. After operation 506, control returns to operation 504.

At 508, the ECU 148 is shipped to the vehicle assembly plant 204. At 510, the ECU 148 is installed into the vehicle 102. At 512, the ECU 148 is configured via the end-of-line systems 210. For example, the end-of-line systems 210 may apply software, firmware, and/or default settings in accordance with vehicle 102 make, model, destination geography, destination country, or other factors. It should be noted that the specific order of certain steps in the process 500 may vary. For instance, the ECU 148 may be shipped to the vehicle assembly plant 204 before execution of operations 504 and/or 506.

The ECU 148 initiates ECU 148 provisioning at operation 514. In an example, the ECU 148 detects that the ECU 148 has been powered on with the vehicle 102 systems via the end-of-line systems 210. Responsive to detecting that the ECU 148 is active, the ECU 148 queries its memory to identify whether the ECU 148 has attempted provisioning. If not, the ECU 148 initiates provisioning mode. For instance, the ECU 148 may request that the embedded modem 144 pursue provisioning for the ECU 148. In another possibility, the embedded modem 144 may be responsible for initiating provisioning of the ECUs 148, and may query the ECUs 148 over the vehicle bus 142 to determine whether any ECUs 148 require provisioning.

At operation 516, the ECU 148 provides the ECU metadata 304 to the embedded modem 144. The embedded modem 144 accordingly receives the data for transmission. At 518, the embedded modem 144 sends ECU provisioning data to the telematics server 162. In an example, the ECU provisioning data includes the ECU metadata 304 as well as vehicle identification data (e.g., VIN, make, model, etc.). The embedded modem 144 may send the data via cellular or Wi-Fi, as discussed above. The telematics server 162 may receive the ECU provisioning data, and may provide that information to the backend systems 208 for review.

At 520, the embedded modem 144 determines whether a response to the sending of the ECU provisioning data is received. In an example, if the configuration of the vehicle 102 is approved by the backend systems 208, the backend systems 208 return a positive configuration result to the telematics server 162, which in turn forwards the result to the embedded modem 144 of the vehicle 102, which in turn forwards the result to the ECU 148. If provisioning is unsuccessful, the backend systems 208 may flag the vehicle 102 as requiring follow-up to address the failure. During an unsuccessful provisioning, the backend systems 208 may also return a negative configuration result to the telematics server 162, which in turn forwards the result to the embedded modem 144 of the vehicle 102, which in turn forwards the result to the ECU 148. If provisioning was successful and the configuration was validated, control passes to operation 522. Otherwise, control passes to operation 524.

At operation 522, the ECU 148 is provisioned and ready for use. In some examples, the ECU 148 may write to storage that the ECU 148 was successfully provisioned. Once provisioned, the ECU 148 may be able to operate, including the use of networked communication services, via the embedded modem 144.

Figure 6:
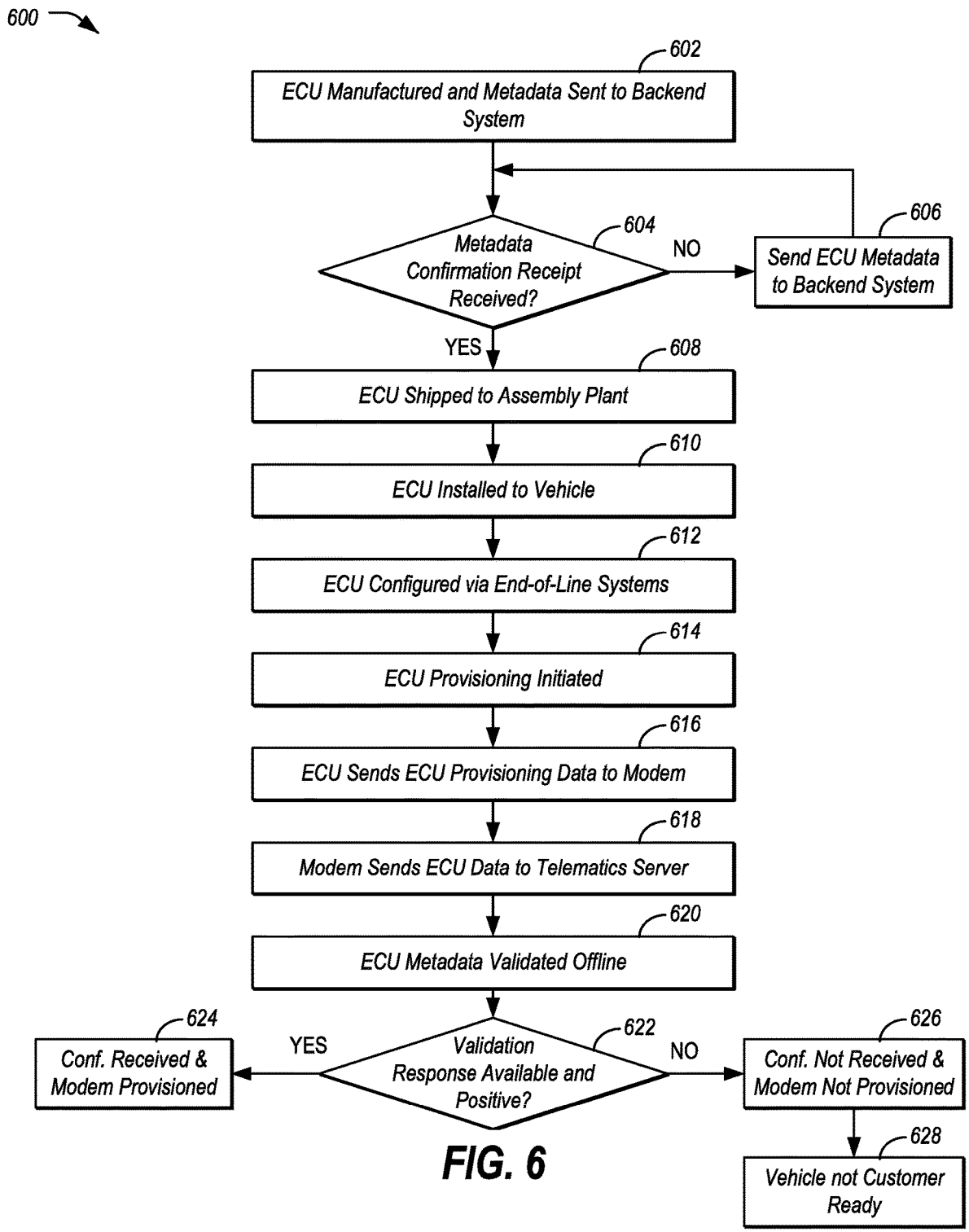
FIG. 6 illustrates an example process for hybrid provisioning of vehicle ECUs utilizing the services of the embedded modem.

FIG. 6 illustrates an example process 600 for hybrid provisioning of vehicle ECUs 148 utilizing the services of the embedded modem 144. As shown, operations 602-618 of the process 600 are consistent with those of operations 502-518 of the process 500 and are not repeated here.

At operation 620 of the process 600, the ECU metadata is validated offline. Accordingly, rather than the ECU 148 waiting for an immediate response from the backend systems 208 via the telematics server 162, the ECU 148 instead may receive the validation response at a later time. For instance, the backend systems 208 may process provisioning requests periodically (e.g., every hour or day), when a predefined number of requests are retrieved (e.g., 10, 100), or simply at the convenience of the backend systems 208.

At 622, the embedded modem 144 determines whether a response to the sending of the ECU provisioning data is received. In an example, if the configuration of the vehicle 102 is approved by the backend systems 208, the backend systems 208 return a positive configuration result to the telematics server 162. The embedded modem 144 may then query the telematics server 162 for the configuration result. If a configuration result is available, the embedded modem 144 may retrieve the result from the telematics server 162 and control passes to operation 624 to provide the result to the ECU 148. If a configuration result is not available, the embedded modem 144 may query the telematics server 162 again at a later time. For instance, the embedded modem 144 may maintain a retry counter and may retry the telematics server 162 for a predefined number of tries and/or a predefined number of hours or days. If the embedded modem 144 is unable to receive a response within the predefined retries or time, or if the response indicates that provisioning is unsuccessful, control passes to operation 626.

At operation 624, as at operation 522, the ECU 148 is provisioned and ready for use. At 626, as at operation 524, the ECU 148 remains unprovisioned. Accordingly, the ECU 148 embedded modem 144 is not ready for use, and the vehicle 102 is not customer ready as indicated at operation 628.

Figure 7:
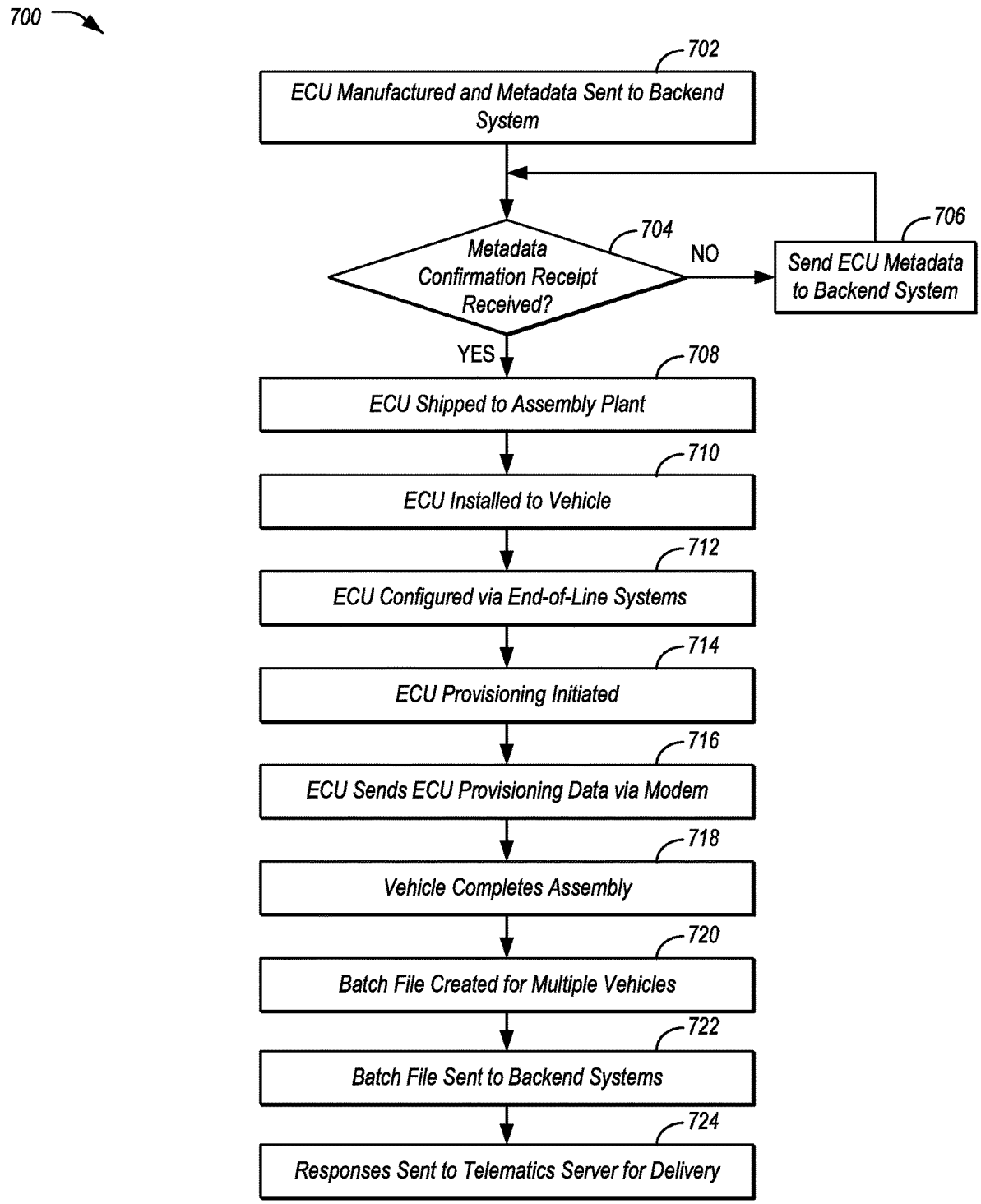
FIG. 7 illustrates an example process for batch provisioning of vehicle ECUs utilizing the services of the embedded modem.

FIG. 7 illustrates an example process 700 for batch provisioning of vehicle ECUs 148 utilizing the services of the embedded modem 144. As shown, operations 702-716 of the process 700 are consistent with those of operations 502-516 of the process 500 and of operations 602-616 of the process 600 and are not repeated here.

At operation 718 of the process 700, assembly of the vehicle 102 is completed. Further vehicles 102 may accordingly continue through the vehicle assembly plant 204 and be assembled, each of the additional vehicles 102 having their own ECUs 148 to be provisioned.

At operation 720, the telematics server 162 creates a batch file for multiple vehicles 102 awaiting provisioning. In an example, the telematics server combined the requests for multiple vehicles 102 awaiting provisioning for ECUs 148 into a single batch request. For instance, the telematics server 162 may match up requests until a predefined number are received (e.g., 10, 100, etc.), and/or until a predefined time period has been reached (e.g., one hour, one day, etc.) The batch request may then be sent to the backend systems 208 at operation 722. The backend system 208 may proves the received batch of requests, and may return a batch response including the results to the telematics server 162. Similar to the individual vehicle 102 processing, responses to the provisioning requests may be received by the telematics server 162 from the backend systems 208, and provided to the vehicles 102 responsive to vehicle 102 queries as discussed above with respect to operations 620-626 of the process 600.

Thus, the provisioning of ECUs 148 may be performed using real-time processing, using batch processing, or using a hybrid approach using aspects of each approach. Accordingly, provisioning of ECUs 148 may be performed using an embedded modem 144 of a vehicle 102 once the embedded modem 144 has itself been provisioned. By using the described approach, each component of the vehicle 102 that may be accessible remotely is properly configured and verified in backend systems 208, where the provisioning may be performed before the vehicle 102 is ready to be sold to the customers.

Computing devices described herein, such as the computing platform 104, mobile device 152, telematics server 162, backend systems 208, and end-of-line systems 210, generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, JavaScript, Python, JavaScript, Perl, PL/SQL, Prolog, LISP, Corelet, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an embedded modem programmed to
provision the modem for the vehicle by requesting from a telematics server confirmation of a modem configuration assigned by end-of-line systems,
receive a request over a vehicle bus from an electronic control unit (ECU) requesting confirmation of an ECU configuration assigned by the end-of-line systems,
send the request to the telematics server for confirmation, and
report a result from the telematics server to the ECU.

2. The vehicle of claim 1, wherein the request includes ECU metadata including uniquely identifiable information of the ECU and uniquely identifiable information of the vehicle, and the result of the confirmation is determined according to a comparison of the ECU information and the vehicle information with ECU metadata provided from a manufacturer of the ECU.

3. The vehicle of claim 1, wherein the result is received from the telematics server responsive to the request.

4. The vehicle of claim 1, wherein the result is received from the telematics server responsive to the embedded modem periodically querying the telematics server for the result.

5. The vehicle of claim 4, wherein the embedded modem is configured to report an error condition if the result is not received from the telematics server after a predetermined number of queries of the telematics server.

6. The vehicle of claim 1, wherein the embedded modem is further programmed to identify whether the embedded modem is configured to utilize Wi-Fi connections for provisioning and, if so, attempt to send the request to the telematics server over Wi-Fi before attempting to send the request to the telematics server over cellular.

7. The vehicle of claim 6, wherein the embedded modem is further programmed to utilize Wi-Fi connections per a configuration received by the embedded modem from end-of-line systems of a vehicle assembly plant.

8. The vehicle of claim 1, wherein the ECU is a BLUETOOTH Low Energy (BLE) controller.

* * * * *